US012155119B2

(12) United States Patent
Ellgardt

(10) Patent No.: US 12,155,119 B2
(45) Date of Patent: Nov. 26, 2024

(54) ANTENNA ARRAY

(71) Applicant: Ovzon Sweden AB, Solna (SE)

(72) Inventor: Anders Ellgardt, Sundbyberg (SE)

(73) Assignee: Ovzon Sweden AB, Solna (SE)

( * ) Notice: Subject to any disclaimer, the term of this patent is extended or adjusted under 35 U.S.C. 154(b) by 240 days.

(21) Appl. No.: 17/616,294

(22) PCT Filed: Jun. 5, 2019

(86) PCT No.: PCT/EP2019/064618

§ 371 (c)(1),
(2) Date: Dec. 3, 2021

(87) PCT Pub. No.: WO2020/244750

PCT Pub. Date: Dec. 10, 2020

(65) Prior Publication Data

US 2022/0158340 A1 May 19, 2022

(51) Int. Cl.
*H01Q 1/38* (2006.01)
*H01Q 1/46* (2006.01)
(Continued)

(52) U.S. Cl.
CPC ............... *H01Q 1/523* (2013.01); *H01Q 1/38* (2013.01); *H01Q 1/46* (2013.01); *H01Q 1/48* (2013.01)

(58) Field of Classification Search
None
See application file for complete search history.

(56) References Cited

U.S. PATENT DOCUMENTS 4,345,256 A 8/1982 Rainwater
5,398,035 A 3/1995 Densmore et al.
(Continued)

FOREIGN PATENT DOCUMENTS

CA 3048778 A1 * 2/2020 ........... H01Q 1/1221
EP 1764933 A1 3/2007
(Continued)

OTHER PUBLICATIONS

International Preliminary Report on Patentability and Written Opinion issued in International Application No. PCT/US2006/049417 Jul. 1, 2008 (6 pages).
(Continued)

*Primary Examiner* — Dameon E Levi
*Assistant Examiner* — Anh N Ho
(74) *Attorney, Agent, or Firm* — Moore & Van Allen PLLC; W. Kevin Ransom

(57) ABSTRACT

An antenna array includes an array of antenna bodies arranged on a planar structure, which, in turn, contains a circuit board with a ground-plane layer. The array of antenna bodies is arranged on a top side of the circuit board. Each of the antenna bodies is dome shaped and attached to the top side of the circuit board along its base. Each of the antenna bodies is connected to a respective top transmission line configured to convey microwave signals to and/or from said antenna bodies. The top transmission lines are further connected to bottom transmission lines via coaxial probes through the ground-plane layer. A resonance cavity is arranged below the top side of the circuit board between each of the antenna bodies. This accomplishes a highly compact design that can be produced in a cost-efficient manner.

8 Claims, 4 Drawing Sheets

(51) Int. Cl.

| | |
|---|---|
| ***H01Q 1/48*** | (2006.01) |
| ***H01Q 1/52*** | (2006.01) |

(56) References Cited

U.S. PATENT DOCUMENTS

| | | | | |
|---|---|---|---|---|
| 5,517,205 | A | 5/1996 | van Heyningen et al. | |
| 6,538,612 | B1 | 3/2003 | King | |
| 6,653,981 | B2 | 11/2003 | Wang et al. | |
| 7,173,571 | B2 | 2/2007 | Webb et al. | |
| 7,420,522 | B1 * | 9/2008 | Steinbrecher | H01Q 17/008 343/893 |
| 7,542,716 | B2 | 6/2009 | Bell et al. | |
| 7,705,793 | B2 | 4/2010 | Kaplan et al. | |
| 8,248,318 | B2 | 8/2012 | Wahlberg et al. | |
| 8,786,506 | B2 | 7/2014 | Ayotte et al. | |
| 2002/0093451 | A1 | 7/2002 | Harmon et al. | |
| 2005/0259021 | A1 | 11/2005 | Stoyanov et al. | |
| 2005/0285808 | A1 * | 12/2005 | Holter | H01Q 21/06 343/754 |
| 2007/0001920 | A1 | 1/2007 | Webb et al. | |
| 2007/0135040 | A1 | 6/2007 | Draim | |
| 2008/0018545 | A1 | 1/2008 | Kaplan et al. | |
| 2009/0322636 | A1 | 12/2009 | Brigham et al. | |
| 2011/0076956 | A1 | 3/2011 | Tronc et al. | |
| 2011/0105126 | A1 | 5/2011 | Liang et al. | |
| 2011/0221649 | A1 | 9/2011 | Price et al. | |
| 2011/0317665 | A1 | 12/2011 | Jung et al. | |
| 2014/0045420 | A1 | 2/2014 | Tont et al. | |
| 2015/0301275 | A1 * | 10/2015 | Andle | H01Q 13/0208 385/43 |
| 2016/0126625 | A1 | 5/2016 | Gurewitz | |
| 2017/0047653 | A1 | 2/2017 | Runyon et al. | |
| 2017/0085314 | A1 | 3/2017 | Davis | |
| 2018/0048061 | A1 * | 2/2018 | Brigham | H01Q 13/0283 |
| 2018/0069322 | A1 * | 3/2018 | Vouvakis | H01Q 21/0025 |
| 2018/0248676 | A1 | 8/2018 | Raggio et al. | |
| 2019/0067823 | A1 * | 2/2019 | Irion, II | H01Q 21/064 |
| 2019/0326982 | A1 | 10/2019 | Darby, III | |

FOREIGN PATENT DOCUMENTS

| | | | |
|---|---|---|---|
| JP | 62-084604 | | 4/1987 |
| JP | 09-153718 | | 6/1997 |
| JP | 10-178313 | | 6/1998 |
| JP | 2001-007637 | A | 1/2001 |
| WO | WO 2004/073229 | A2 | 8/2004 |
| WO | WO 2007/064094 | A1 | 6/2007 |
| WO | WO 2007/067016 | A1 | 6/2007 |

OTHER PUBLICATIONS

International Search Report and Written Opinion for PCT/EP2014/000391, mailed Apr. 23, 2014 (10 pages).

International Preliminary Report on Patentability and Written Opinion issued in International Patent Application No. PCT/EP2008/007548 Mar. 16, 2010 (11 pages).

International Search Report and Written Opinion for PCT/EP2019/066420, mailed Sep. 19, 2019 (11 pages).

International Search Report (PCT/EP2019/064618) dated Jan. 27, 2020 (5 pages).

* cited by examiner

ANTENNA ARRAY

CROSS-REFERENCE TO RELATED APPLICATIONS

This application is a national stage filing under 35 U.S.C. § 371 of International Application No. PCT/EP2019/064618, filed on Jun. 5, 2019. The specification of the foregoing application is incorporated herein by reference in its entirety.

TECHNICAL FIELD

The invention relates generally to transmission and reception of microwave signals. In particular, the present invention concerns an antenna array suitable for communicating broadband signals in a small-sized terminal, which for instance implements a satellite transceiver or a unit for broadcasting high-resolution video signals.

BACKGROUND

Today, there is an increasing demand for high-throughput satellite communication in portable terminals. However, it is a challenging task to combine high bandwidth communication capacity with coverage in sparsely populated or desolate areas. Providing a truly mobile satellite-based broadband service not only requires compact terminals. It is also necessary that the terminals can be manufactured at a reasonable cost to enable communication services at an attractive price.

The prior art contains some examples of broadband antennas. However, for various reasons, none of these is suitable for mobile applications.

US 2017/0331199 shows an antenna, which comprises a ground plane and at least a first and a second antenna element. Here, each antenna element has a feed point, a cavity, a main body, a tip and at least a first tapered portion and a second tapered portion. Each antenna element is arranged on the ground plane, where said first and second tapered portions extend along the antenna element from said tip towards the ground plane of the antenna element, and where each antenna element extends essentially perpendicularly to said ground plane along a center axis of the antenna element. Each antenna element has at least a first leg and a second leg, where said first leg extends from said main body to the first feed point, where said feed point is located between the first leg and the ground plane, and where said second leg extends from said main body to the ground plane, and where said second leg is electrically connected to the ground plane.

U.S. Pat. No. 7,616,169 describes an electrically controlled group antenna, an antenna element suitable for incorporation in such a group antenna and an antenna module including several such antenna elements. The antenna elements include a rotationally symmetrical body tapering towards one end of the body. The rotationally symmetrical body is provided with a metallic casing surface. Several antenna elements are arranged separately on a common earth plane. A broadband group antenna is achieved that has a relatively simple design.

Both the above solutions are suitable for handling broadband signals. However, neither of them has a design appropriate for portable satellite communication equipment. Namely, the antennas are bulky, fragile and/or complex to manufacture.

SUMMARY

One object of the present invention is therefore to offer a compact antenna design suitable for handling broadband signals.

Another object of the invention is to offer a solution that enables such an antenna design to be produced at relatively low cost.

Further, it is an object of the invention to provide a comparatively sturdy and robust design of an antenna suitable for handling broadband signals.

According to the invention, these objects are achieved by an antenna array including an array of antenna bodies that are arranged on a planar structure. The planar structure contains a circuit board with a ground plane. The array of antenna bodies is arranged on a top side of the circuit board. Each of the antenna bodies has a dome shaped structure, which is attached to the top side of the circuit board along its base. Each of the antenna bodies is connected to a respective top transmission line that is configured to convey microwave signals to and/or from the antenna bodies. The top transmission lines are further connected to bottom transmission lines via coaxial probes through the ground plane. A resonance cavity is arranged below a bottom side of the circuit board between each of said antenna bodies.

This antenna is advantageous because the circuit-board based design renders the manufacturing process very cost-efficient. It is further straightforward to attain high physical precision when building the antenna around a two-dimensional base in the form of a printed circuit board. Moreover, this type of design results in high overall space efficiency. In other words, the antenna can be made physically thin, especially in comparison to the abovementioned prior-art solutions. In fact, it is straightforward to include the proposed antenna array in a portable transceiver design compact enough to qualify as carry-on luggage that can be fitted into the overhead compartment of a passenger aircraft.

According to one embodiment of the invention, the antenna bodies are designed to form horns between one another. In particular, a first electrically conductive surface element of a first antenna body is configured to constitute a first portion of an antenna horn, and a second electrically conductive surface element of a second antenna body of said antenna bodies is configured to constitute a second portion of the antenna horn. The first and second antenna bodies adjoin one another in such a manner that the first and second electrically conductive surface elements are located closer to one another than any other surface elements of the first and second antenna bodies.

Preferably, each antenna body is mirror symmetric in exactly two planes that are orthogonal to one another. The antenna bodies are further arranged in the array according to a pattern in which the first and second electrically conductive surface elements of adjoining antenna bodies pairwise form a respective antenna horn in such a manner that the antenna array contains antenna elements configured to transmit and/or receive signals of a first polarization direction via a first subset of said horns and transmit and/or receive signals of a second polarization direction via a second subset of said horns. The first and second polarization directions are here orthogonal to one another and each of the antenna bodies form part of at least one horn included in the first subset and at least one horn included in the second subset. This, is beneficial both in terms of efficiency and design flexibility, since the mutual relationship between the antenna bodies ensures high isolation between signals representing the two polarization directions while enabling the shape of the of the antenna bodies and the distances between them to be optimized to match a particular range of the electromagnetic spectrum.

According to another embodiment of the invention, the base of the dome shaped structure of each antenna body is octagon shaped. Further, each of the horns formed by the first and second electrically conductive surface elements has a tapered profile towards the top side of the circuit board. Moreover, an aperture between these electrically conductive surface elements is symmetric around a normal to the top side of the circuit board. This design is advantageous because it provides further adjustment possibilities with respect to bandwidth requirements and physical form factors.

According to yet another embodiment of the invention, the ground-plane layer is electrically connected to a first circuit pattern on the bottom side of the circuit board, which first circuit pattern is further electrically connected to a second circuit pattern on the top side of the circuit board by means of a plurality of vias through the circuit board. Thereby, the ground plane extends also to the top side of the circuit board. Thus, the antenna bodies can be connected to external circuitry in a very compact and efficient manner.

According to embodiments the invention, the top transmission line arrangement is implemented in suspended stripline, microstrip or stripline design, and the bottom transmission line is implemented by means of a suspended stripline design, a coaxial cable, stripline design or microstrip design. Consequently, a broad range of design options is provided, both in terms of how to implement the antenna itself and in terms of how the connections thereto are embodied.

According to another embodiment of the invention, antenna bodies are attached to the top side of the circuit board by of soldering and/or mechanical fasteners. This renders the manufacturing procedure uncomplicated and cost-efficient. The resulting antenna also becomes comparatively durable.

According to yet another embodiment of the invention, the antenna includes a shell member of a non-conductive material. The shell member is arranged on the planar structure and contains a plurality of cavities, which each constitutes one of the antenna bodies. An electrically conductive layer covers a respective active surface of each cavity, which active surface faces the top side of the circuit board. Thus, the shell member implements the entire array of antenna bodies in a single piece. Naturally, this renders the production process very time efficient.

Preferably, the shell member has a generally flat exterior surface that faces away from the top side of the circuit board because this gives the antenna a nice-looking and easy to clean exterior surface.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
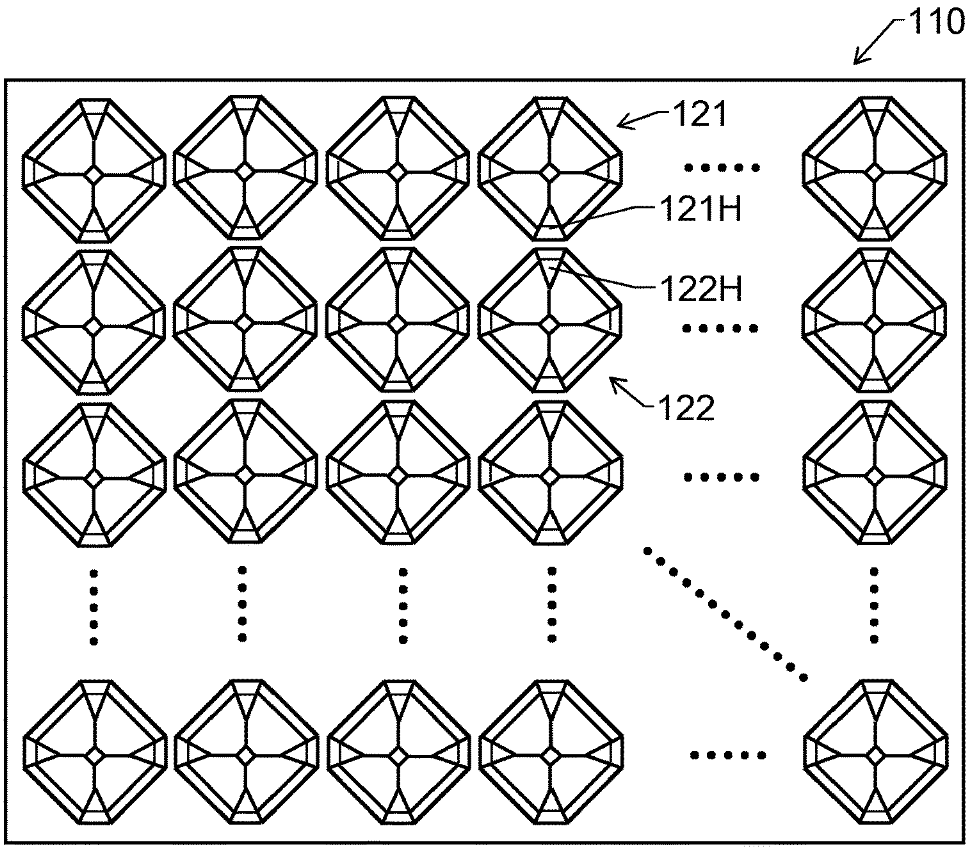
FIG. 1 shows a planar structure with antenna bodies according to one embodiment of the invention.

FIG. 1 shows a planar structure 110 with antenna bodies according to one embodiment of the invention. The antenna bodies are arranged in an array on a top side of a circuit board that is included in the planar structure 110. This means that the antenna bodies are organized in a pattern of straight rows and columns. The exact number of antenna bodies is not critical. However, of course, a larger number of antenna bodies is associated with higher efficiency than a ditto lower number. Preferably, although not necessarily, the pattern is equilateral, i.e. the number of rows equals the number of columns, say 2 by 2 to 40 by 40, preferably 6 by 6 to 25 by 25. In FIG. 1, first and second exemplifying antenna bodies are designated by reference numerals 121 and 122 respectively.

Figure 2:
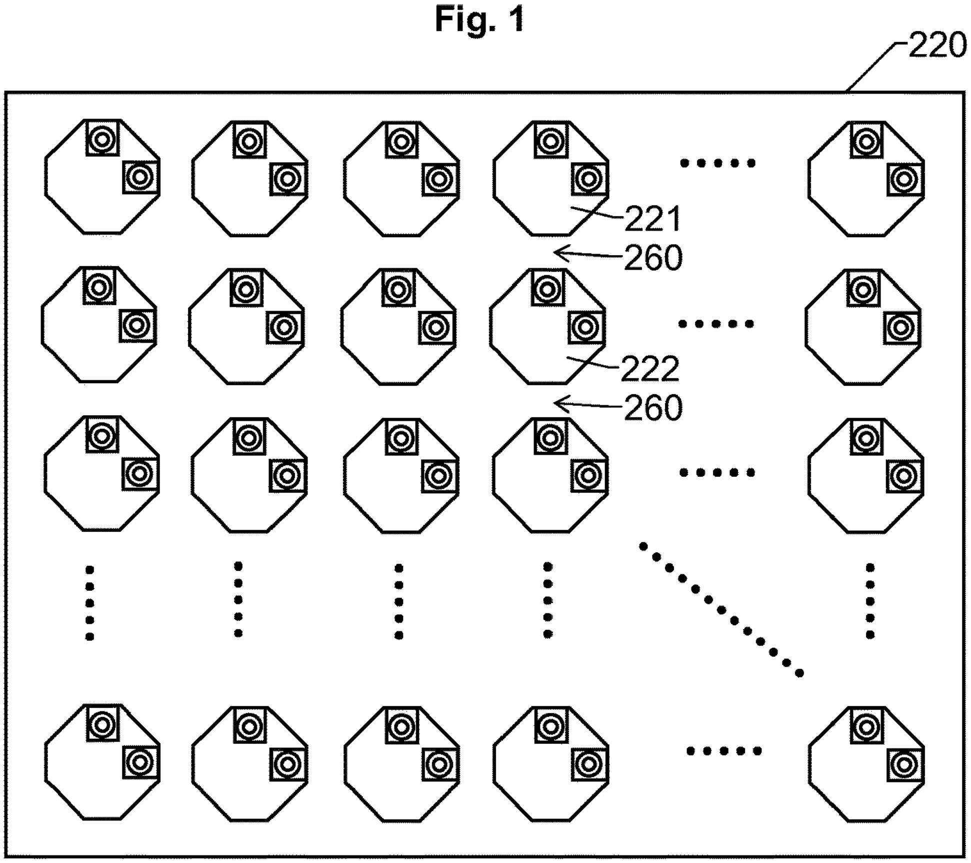
FIG. 2 shows a top side of a ground-plane layer included in the planar structure according to one embodiment of the invention.

The planar structure 110 further contains a ground-plane layer that is arranged below a bottom side of the circuit board, i.e. opposite to antenna bodies 121 and 122. FIG. 2 shows an example of such a ground-plane layer 220 seen from a top side thereof. The ground-plane layer 220 is made of an electrically conductive material, such as a metal, e.g. aluminum.

Each of the antenna bodies 121 and 122 contains a dome shaped structure, which is attached to the top side of the circuit board 210, for example by means of soldering and/or mechanical fasteners. The antenna bodies 121 and 122 are attached along a respective base of the dome shaped structure. The mechanical fasteners may be represented by snap in fasteners or an arrangement of compressed springs configured to provide galvanic contact between the antenna bodies 121 and 122 and a circuit pattern on the top side of the circuit board.

Figure 3:
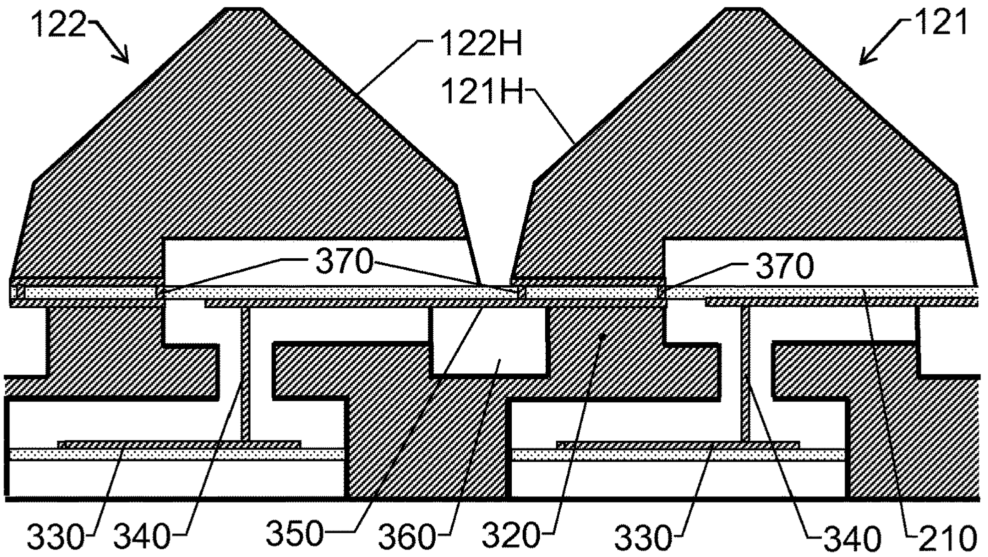
FIGS. 3-8 illustrate, by means of cross-section side views, the structure of the antenna array according embodiments of the invention.

Turning now to FIG. 3, we see a cross-section side view, illustrating the structure of the antenna array according to one embodiment of the invention.

Each antenna body 121 and 122 is connected to a respective top transmission line 350, which is configured to convey microwave signals to and/or from the antenna body 121 or 122 respectively, i.e. for transmitting and/or receiving electromagnetic energy. Here, the top transmission lines 350 are implemented in suspended stripline design. The top transmission lines 350 are further connected to bottom transmission lines 330 via a respective coaxial probe 340 through the circuit board 210 and the ground-plane layer 220. The ground-plane layer 220 may be a solid piece of metal in which a pattern of cavities and openings have been milled out. In this embodiment, also the bottom transmission line 330 is implemented in suspended stripline design. However, as will be discussed below, a number of alternative bottom transmission line designs are also conceivable according to the invention. In fact, the same is true for the top transmission line design. Furthermore, according to the invention, any combination of top and bottom transmission line design is possible. The choice of the designs used is merely a matter of what is most suitable for the specific implementation.

A plurality of vias 370 through the circuit board 210 connect the ground-plane layer 320 to circuitry on the top side of the circuit board 210 so that the ground plane effectively extends above the circuit board 210 and thus can be further connected to the antenna bodies 121 and 122.

A resonance cavity 360 is arranged below the bottom side of the circuit board 210 between each of said antenna bodies 121 and 122 respectively. The resonance cavity 360 constitutes a stub, i.e. a length of waveguide connected at one end only, which is configured to direct as much as possible of the electromagnetic energy from the top transmission line 350 "upwards" towards the antenna bodies 121 and 122. Analogously, when the antenna operates in a receiving mode, the resonance cavity 360 configured to direct as much as possible of the electromagnetic energy that reaches the antenna bodies 121 and 122 "downwards" towards the top transmission line 350.

In FIG. 2, the resonance cavity is represented by the reference numeral 260. As can be seen here, the resonance cavity 260 is, in fact, a continuous milled-out volume between all the antenna elements, which each is mounted on a respective "island" 221 and 222 respectively where no, or only relatively little, material has been milled out from the solid piece of metal.

According to one embodiment of the invention, each antenna body 121 and 122 contains electrically conductive surface elements. Specifically, here, a first electrically conductive surface element 121H of a first antenna body 121 is configured to constitute a first portion of an antenna horn. Analogously, a second electrically conductive surface element 122H of a second antenna body 122 is configured to constitute a second portion of the antenna horn. The first and second antenna bodies 121 and 122 adjoin one another in such a manner that the first and second electrically conductive surface elements 121H and 122H respectively are located closer to one another than any other surface elements of the first and second antenna bodies 121 and 122. Thus, together, the first and second electrically conductive surface elements 121H and 122H form a horn configured to convey electromagnetic waves towards or from the top transmission line 350 depending on whether the antenna receives or transmits signals.

Each of the horns formed by the first and second electrically conductive surface elements 121H and 122H has a tapered profile towards the top side of the circuit board 210, for example as illustrated in FIG. 3. An aperture towards the resonance cavity 360 between the first and second electrically conductive surface elements 121H and 122H is symmetric around a normal to the top side of the circuit board 210.

The distance between the first and second electrically conductive surface elements 121H and 122H along the circuit board 210, the center distance between the first and second antenna bodies 121 and 122, the height of the first and second antenna bodies 121 and 122 above the circuit board 210 and the profile of the first and second electrically conductive surface elements 121H and 122H are different design parameters, which are selected depending on the frequency spectrum, the efficiency required and various physical constraints placed on the implementation.

Preferably, each antenna body 121 and 122 is mirror symmetric in exactly two planes that are orthogonal to one another. For example, the base of the dome shaped structure of the antenna bodies 121 and 122 may be octagon shaped, as shown in FIG. 1.

The antenna bodies 121 and 122 are further preferably arranged in the array according to a pattern in which the first and second electrically conductive surface elements 121H and 122H of adjoining antenna bodies pairwise form a respective antenna horn in such a manner that the antenna array contains horns of first and second subsets. The horns of the first subset are configured to transmit and/or receive signals of a first polarization direction, and the horns of the second subset are configured to transmit and/or receive signals of a second polarization direction, which is orthogonal to the first polarization direction. Moreover, each of the antenna bodies 121 and 122 form part of at least one horn that is included in the first subset and at least one horn that is included in the second subset. In FIG. 1, the first subset horns may contain all the electrically conductive surface elements 121H and 122H extending along a vertical direction, and the second subset horns may contain all the electrically conductive surface elements extending along a horizontal direction in the array of antenna bodies.

An antenna array, wherein the base of the dome shaped structure of each antenna body 121 and 122 is octagon shaped is advantageous because such geometry provides high isolation between signals representing the two orthogonal polarization directions. At the same time, the octagon shape renders it straightforward to configure the antenna bodies so that their tapered profile and the distances between the antenna bodies is optimized to match a particular range of the electromagnetic spectrum in which the antenna array is to operate. For example, in contrast to a design where the antenna bodies are circularly symmetric, the octagon-shaped base makes it possible to vary a distance along which an opening between the first and second electrically conductive surface elements 121H and 122H are effectively parallel to one another towards the resonance cavity 360 without the need to alter a center-to-center distance between the antenna bodies. From a design point-of-view, this is very beneficial when optimizing the design to a match particular frequency range of operation.

Figure 4:
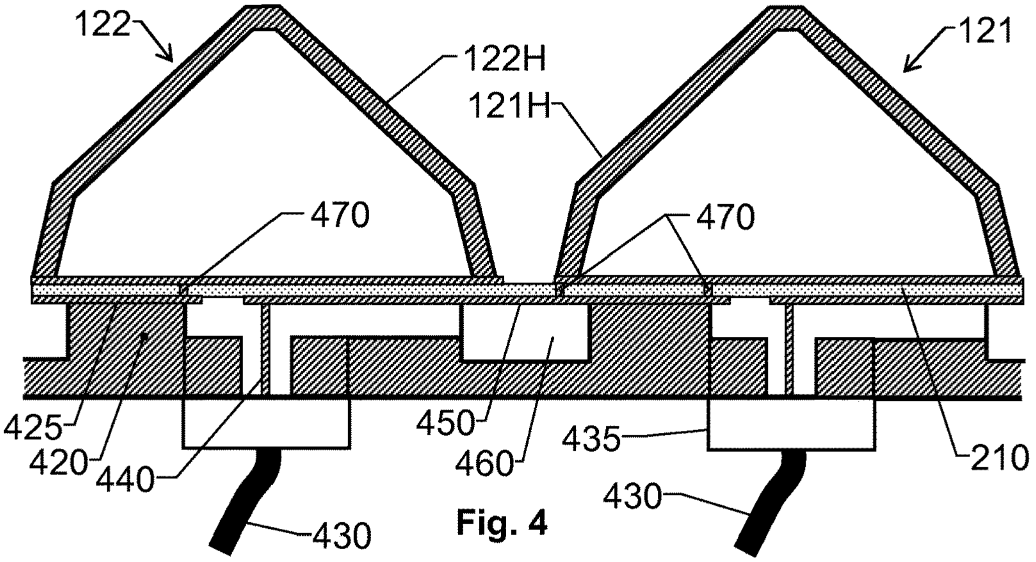

FIG. 4 shows a cross-section a side view illustrating the structure of the antenna array according to another embodiment of the invention. Here, the top transmission line arrangement is implemented in a microstrip design 450, and the bottom transmission line is implemented by means of a coaxial cable 430.

Analogous to the above, the planar structure 110 contains a circuit board 210 and a ground-plane layer 420, and the array of antenna bodies 121 and 122 being arranged on a top side of the circuit board 210, and each antenna body 121 and 122 contains a dome shaped structure being attached to the top side of the circuit board 210 along its base. Each antenna body 121 and 122 is connected to a respective top transmission line 450 configured to convey microwave signals to and/or from the antenna bodies 121 and 122. The top transmission lines 450 are connected to the bottom transmission lines 430 via coaxial probes 440 through the ground-plane layer 420. Connection to bottom transmission lines 430 may be facilitated by connector 435. In addition, here a resonance cavity 460 is arranged below a bottom side of the circuit board 210 between each of the antenna bodies 121 and 122. The top transmission line 450 together with a slotline in between the antenna bodies 121 and 122 and the resonance cavity 460 constitutes a so-called balun, i.e., a balanced transmission line to an unbalanced transmission line conversion. The balun is configured to convert the signal from being an unbalanced signal along the top transmission line 450 to a balanced signal between the antenna bodies 121 and 122 and the resonance cavity 460.

A first circuit pattern 425 on the bottom side of the circuit board is electrically connected to the ground-plane layer

420. The first circuit pattern 425, in turn, is electrically connected to a second circuit pattern on the top side of the circuit board 210 by means of a plurality of vias 470 through the circuit board 210. Consequently, the ground plane also extends above the circuit board 210.

Figure 9:
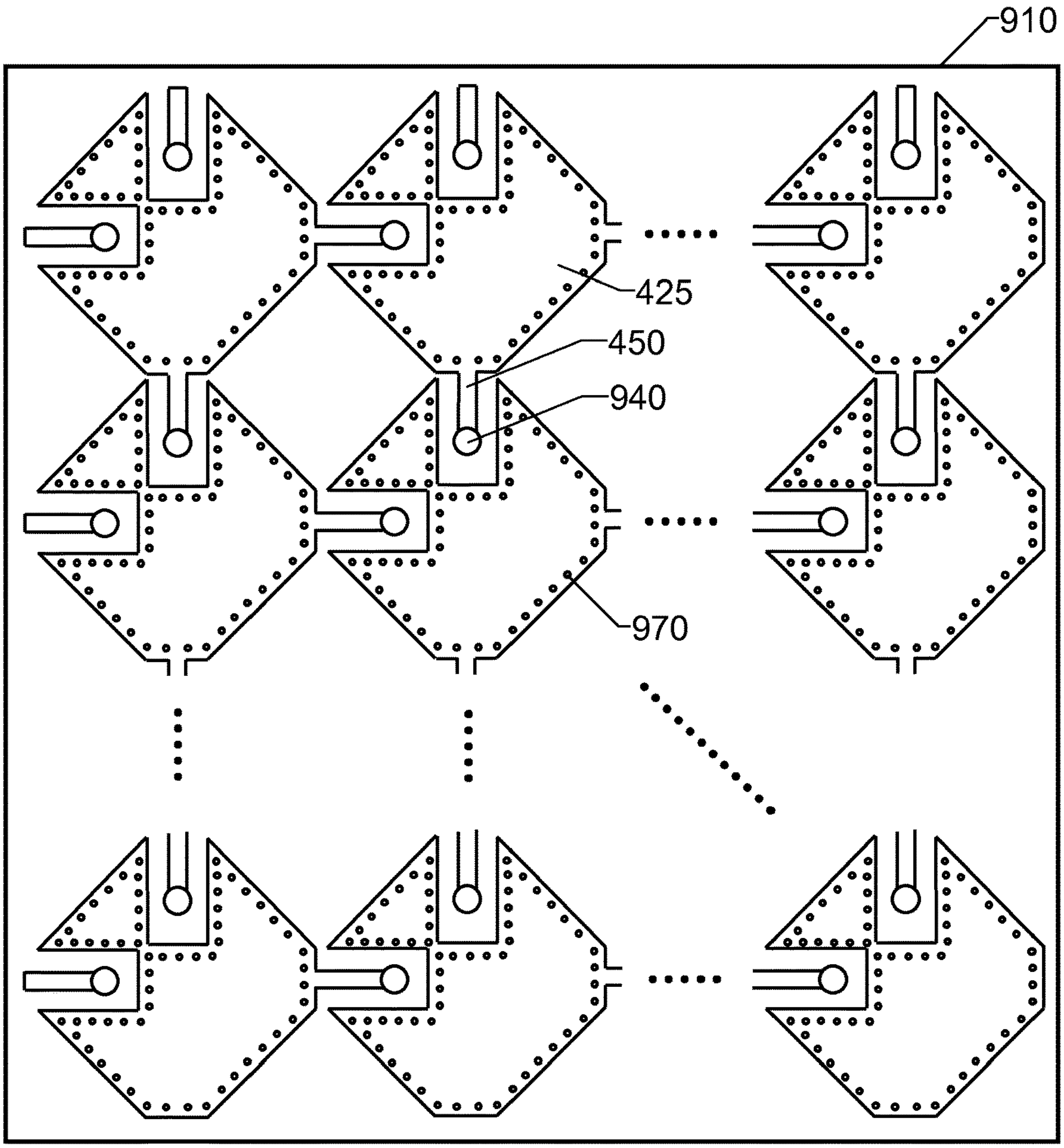
FIG. 9 shows a bottom side of the circuit board included in the planar structure according to one embodiment of the invention.

FIG. 9 shows the bottom side of the circuit board 910 and the first circuit pattern 425 according to this embodiment of the invention. Here, the reference numeral 970 designates the positions of said plurality of vias through the circuit board 910. The reference numeral 940 designates a portion of the first circuit pattern being connected to the coaxial probe 440 through the ground-plane layer 420.

Figure 5:
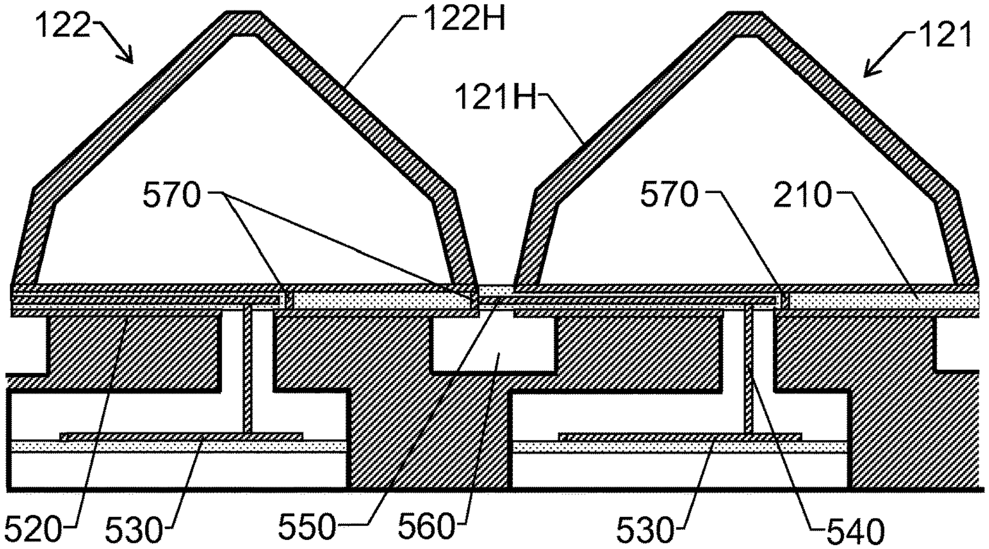

FIG. 5 illustrates, by means of cross-section a side view, the structure of the antenna array according to another embodiment of the invention. Here, the top transmission line arrangement is implemented in a stripline design 550, and the bottom transmission line is implemented by means of a suspended stripline 530.

Analogous to the above, the planar structure 110 contains a circuit board 210 and a ground-plane layer 520, and the array of antenna bodies 121 and 122 being arranged on a top side of the circuit board 210, and each antenna body 121 and 122 contains a dome shaped structure being attached to the top side of the circuit board 210 along its base. Each antenna body 121 and 122 is connected to a respective top transmission line 550 configured to convey microwave signals to and/or from the antenna bodies 121 and 122, and the top transmission lines 550 are further connected to the bottom transmission lines 530 via coaxial probes 540 through the ground-plane layer 520. In addition, here a resonance cavity 560 is arranged below a bottom side of the circuit board 210 between each of the antenna bodies 121 and 122.

The ground-plane layer 520 is electrically connected to a first circuit pattern on the bottom side of the circuit board 210, which first circuit pattern is further electrically connected to a second circuit pattern on the top side of the circuit board 210 by means of a plurality of vias 570 through the circuit board 210 so as to extend a ground plane represented by the ground-plane layer 520 to the top side of the circuit board 210.

Figure 6:
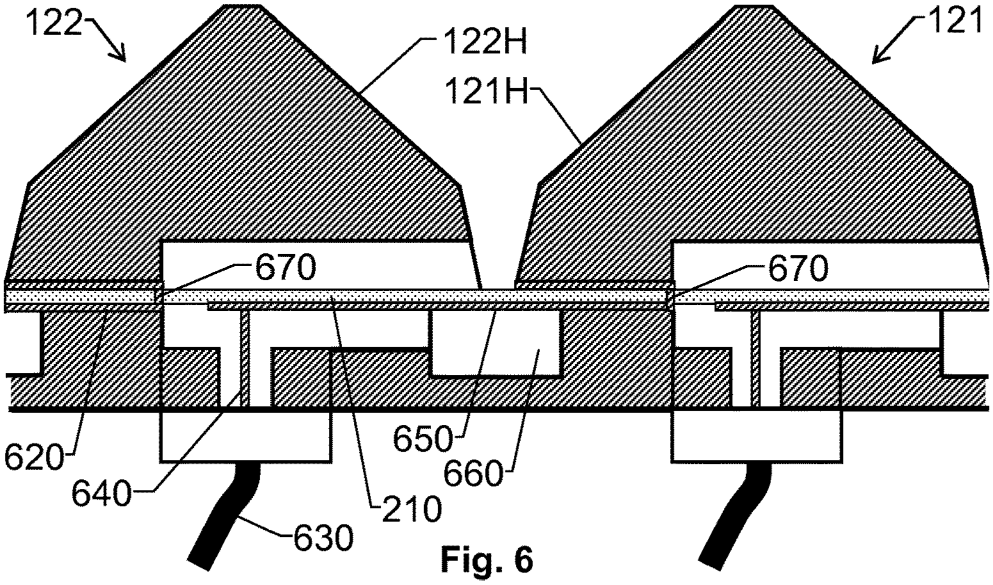

FIG. 6 illustrates, by means of cross-section a side view, the structure of the antenna array according to another embodiment of the invention. Here, the top transmission line arrangement is implemented in a suspended stripline design 650, and the bottom transmission line is implemented by means of a coaxial cable 630.

Analogous to the above, the planar structure 110 contains a circuit board 210 and a ground-plane layer 620, and the array of antenna bodies 121 and 122 being arranged on a top side of the circuit board 210, and each antenna body 121 and 122 contains a dome shaped structure being attached to the top side of the circuit board 210 along its base. Each antenna body 121 and 122 is connected to a respective top transmission line 650 configured to convey microwave signals to and/or from the antenna bodies 121 and 122, and the top transmission lines 650 are further connected to the bottom transmission lines 630 via coaxial probes 640 through the ground-plane layer 620. In addition, here a resonance cavity 660 is arranged below a bottom side of the circuit board 210 between each of the antenna bodies 121 and 122.

The ground-plane layer 620 is electrically connected to a first circuit pattern on the bottom side of the circuit board 210, which first circuit pattern is further electrically connected to a second circuit pattern on the top side of the circuit board 210 by means of a plurality of vias 670 through the circuit board 210 so as to extend a ground plane represented by the ground-plane layer 620 to the top side of the circuit board 210.

Figure 7:
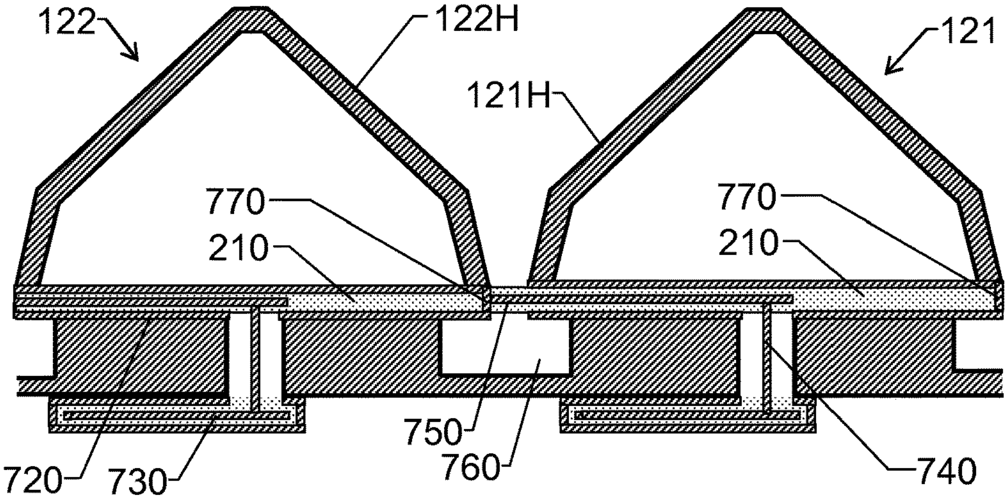

FIG. 7 illustrates, by means of cross-section a side view, the structure of the antenna array according to another embodiment of the invention. Here, the top transmission line arrangement is implemented in a stripline design 750, and the bottom transmission line 730 is likewise implemented by means of a stripline design.

Analogous to the above, the planar structure 110 contains a circuit board 210 and a ground-plane layer 720, and the array of antenna bodies 121 and 122 being arranged on a top side of the circuit board 210, and each antenna body 121 and 122 contains a dome shaped structure being attached to the top side of the circuit board 210 along its base. Each antenna body 121 and 122 is connected to a respective top transmission line 750 configured to convey microwave signals to and/or from the antenna bodies 121 and 122, and the top transmission lines 750 are further connected to the bottom transmission lines 730 via coaxial probes 740 through the ground-plane layer 720. In addition, here a resonance cavity 760 is arranged below a bottom side of the circuit board 210 between each of the antenna bodies 121 and 122.

The ground-plane layer 720 is electrically connected to a first circuit pattern on the bottom side of the circuit board 210, which first circuit pattern is further electrically connected to a second circuit pattern on the top side of the circuit board 210 by means of a plurality of vias 770 through the circuit board 210 so as to extend a ground plane represented by the ground-plane layer 720 to the top side of the circuit board 210.

Figure 8:
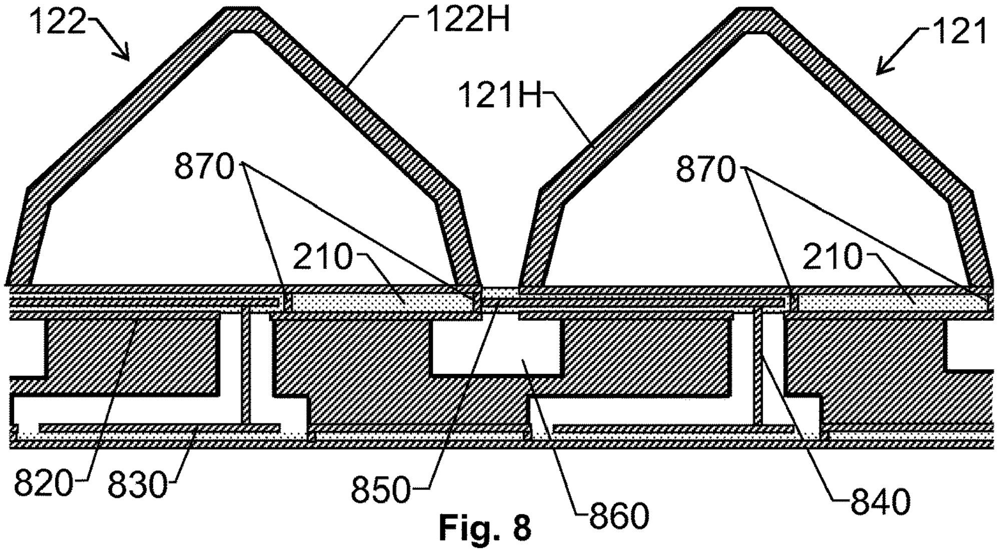

FIG. 8 illustrates, by means of cross-section a side view, the structure of the antenna array according to one embodiment of the invention. Here, the top transmission line arrangement is implemented in a stripline design 850, and the bottom transmission line 830 is implemented by means of a microstrip design.

Analogous to the above, the planar structure 110 contains a circuit board 210 and a ground-plane layer 820, and the array of antenna bodies 121 and 122 being arranged on a top side of the circuit board 210, and each antenna body 121 and 122 contains a dome shaped structure being attached to the top side of the circuit board 210 along its base. Each antenna body 121 and 122 is connected to a respective top transmission line 850 configured to convey microwave signals to and/or from the antenna bodies 121 and 122, and the top transmission lines 850 are further connected to the bottom transmission lines 830 via coaxial probes 840 through the ground-plane layer 820. In addition, here a resonance cavity 860 is arranged below a bottom side of the circuit board 210 between each of the antenna bodies 121 and 122.

The ground-plane layer 820 is electrically connected to a first circuit pattern on the bottom side of the circuit board 210, which first circuit pattern is further electrically connected to a second circuit pattern on the top side of the circuit board 210 by means of a plurality of vias 870 through the circuit board 210 so as to extend a ground plane represented by the ground-plane layer 820 to the top side of the circuit board 210.

Figure 10:
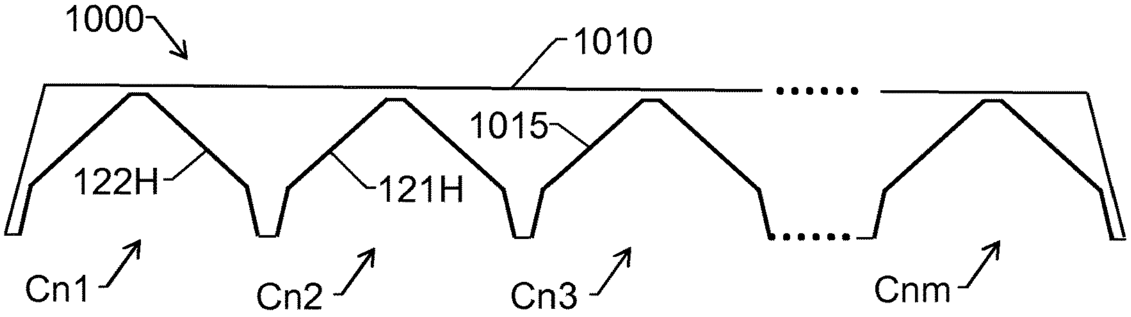
FIG. 10 shows a cross-section side view of a shell member implementing the antenna bodies according to one embodiment of the invention.

FIG. 10 shows a cross-section side view of a shell member 1000 implementing the antenna bodies according to an embodiment of the invention that is combinable with any of the above-described embodiments.

The shell member 1000 is made of a non-conductive material, and the shell member 1000 is arranged on the planar structure 110 instead of the antenna bodies 121 and 122.

The shell member 1000 contains a plurality of cavities 7, Cn2, Cn3, . . . , Cnm each of replaces one of the antenna bodies 121 and 122 by means of an electrically conductive layer 1015 that covers a respective active surface of each cavity of said plurality of cavities Cn1, Cn2, Cn3, . . . , Cnm. The active surface faces the top side of the circuit board 210, thus representing a circuit element equivalent to the outer surface an antenna body 121 or 122. Preferably, the shell member 1000 has a generally flat exterior surface 1010 facing away from the top side of the circuit board 210, since thereby the antenna obtains a nice-looking and easy to clean exterior surface.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. An antenna array comprising:

an array of antenna bodies arranged on a planar structure, the planar structure comprising a circuit board and a ground-plane layer, the array of antenna bodies being arranged on a top side of the circuit board, wherein a first electrically conductive surface element of a first antenna body of said antenna bodies is configured to constitute a first portion of an antenna element, and a second electrically conductive surface element of a second antenna body of said antenna bodies is configured to constitute a second portion of the antenna element, the first and second antenna bodies adjoining one another in such a manner that the first and second electrically conductive surface elements are located closer to one another than any other surface elements of the first and second antenna bodies, and each of the antenna elements formed by said first and second electrically conductive surface elements has a tapered profile towards the top side of the circuit board, and an aperture between said first and second electrically conductive surface elements is symmetric around a normal to the top side of the circuit board, each of said antenna bodies is mirror symmetric in exactly two planes being orthogonal to one another, said antenna bodies are arranged in said array according to a pattern in which each respective first and second electrically conductive surface elements of adjoining antenna bodies pairwise form a respective antenna element in such a manner that said antenna array comprises a set of antenna elements configured to transmit and/or receive signals of a first polarization direction via a first subset of said set of antenna elements and to transmit and/or receive signals of a second polarization direction via a second subset of said set of antenna elements, the first and second polarization directions being orthogonal to one another and each of said antenna bodies forming part of at least one antenna element included in the first subset and at least one antenna element included in the second subset, each of said antenna bodies comprising a dome shaped structure which is attached to said top side of the circuit board along a base of the dome shaped structure, the base of the dome shaped structure of each of said antenna bodies is octagon shaped, each of said antenna bodies being connected to a respective top transmission line configured to convey microwave signals to and/or from said antenna bodies, the top transmission lines being further connected to bottom transmission lines via coaxial probes through said ground-plane layer, and a resonance cavity being arranged below a bottom side of the circuit board between each of said antenna bodies.

2. The antenna array according to claim 1, wherein:

the ground-plane layer is electrically connected to a first circuit pattern on the bottom side of the circuit board, wherein said first circuit pattern is further electrically connected to a second circuit pattern on the top side of the circuit board (210) by means of a plurality of vias through the circuit board so as to extend a ground plane represented by the ground-plane layer to the top side of the circuit board.

3. The antenna array according to claim 1, wherein:

the top transmission line arrangement is implemented in suspended stripline design, and the bottom transmission line is implemented by means of one of a suspended stripline design, a coaxial cable, stripline design or microstrip design.

4. The antenna array according to claim 1, wherein:

the top transmission line arrangement is implemented in microstrip design, and the bottom transmission line is implemented by means of one of a suspended stripline design, a coaxial cable, stripline design or microstrip design.

5. The antenna array according to claim 1, wherein:

the top transmission line arrangement is implemented in stripline design, and the bottom transmission line is implemented by means of one of a suspended stripline design, a coaxial cable, stripline design or microstrip design.

6. The antenna array according to claim 1, wherein said antenna bodies are attached to the top side of the circuit board by at least one of soldering or mechanical fasteners.

7. The antenna array according to claim 1, comprising a shell member of a non-conductive material, wherein the shell member is arranged on the planar structure and comprises a plurality of cavities each of which constitutes one of said antenna bodies by means of an electrically conductive layer covering a respective active surface of each cavity of said plurality of cavities, wherein each respective active surface faces the top side of the circuit board.

8. The antenna array according to claim 7, wherein the shell member comprises a generally flat exterior surface facing away from the top side of the circuit board.

* * * * *